United States Patent [19]

Selover, Jr. et al.

[11] 4,326,016
[45] Apr. 20, 1982

[54] SWAGED SEAL FOR FUSED SALT BATTERIES

[75] Inventors: Theodore B. Selover, Jr., Shaker Heights, Ohio; Thomas H. Hacha, Troy, Mich.

[73] Assignee: The Standard Oil Company, Cleveland, Ohio

[21] Appl. No.: 221,390

[22] Filed: Dec. 30, 1980

[51] Int. Cl.³ .............................................. H01M 2/08
[52] U.S. Cl. .................................... 429/184; 429/181; 429/103; 429/112; 174/77 R
[58] Field of Search ............. 429/181, 184, 185, 112, 429/103; 174/77 R, 152 R

[56] References Cited

U.S. PATENT DOCUMENTS

| | | | |
|---|---|---|---|
| 3,472,701 | 10/1969 | Selover, Jr. et al. | 429/183 |
| 3,645,792 | 2/1972 | Hacha | 429/112 |
| 3,678,178 | 7/1972 | Hubbauer et al. | 429/181 X |
| 3,874,929 | 4/1975 | Greatbatch | 429/181 X |
| 4,252,873 | 2/1981 | Epstein et al. | 429/181 |
| 4,278,744 | 7/1981 | Athearn | 429/181 |

*Primary Examiner*—Charles F. LeFevour
*Attorney, Agent, or Firm*—Salvatore P. Pace; Herbert D. Knudsen; Larry W. Evans

[57] ABSTRACT

This invention is directed toward a seal (25) for fused salt batteries (10) having a current conducting rod (19) partially within said battery and partially outside which includes a layer of compressible material (32) on the body of the current conducting rod leaving exposed the opposite ends thereof and a swaged metal sheath (33) covering and compressing the layer of material to approximately its maximum density. Optionally, a sealing glass (35) having a low coefficient of thermal expansion approximating that of the current conducting rod and the metal sheath can also be employed over the end of the rod and/or a plating (31) of a conductive metal can be provided over the end of the current conducting rod outside of the battery and/or a separate coating (28) of a different material can be deposited on the rod between the rod and the layer of compressible material. A process is also provided for forming the seal.

10 Claims, 3 Drawing Figures

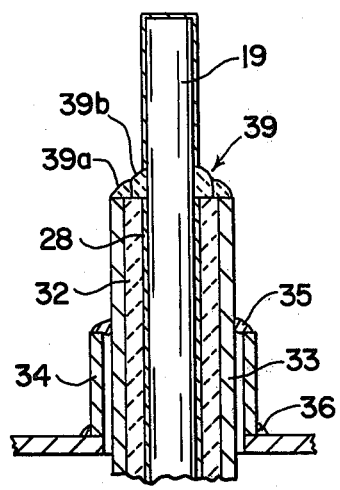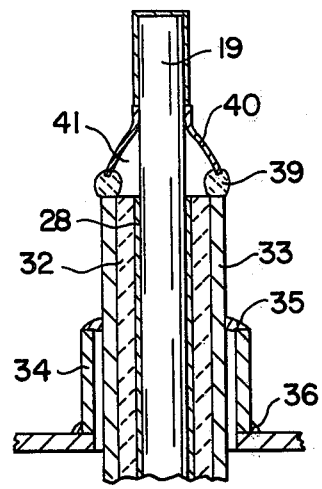

SWAGED SEAL FOR FUSED SALT BATTERIES

TECHNICAL FIELD

The present invention is directed toward high temperature fused salt secondary batteries. More specifically it provides a hermetic seal for the electrodes of such batteries. Fused salt batteries are well known and utilize as an electrolyte a eutectic mixture of several salts which are heated within the battery to a liquid state. Electrolyte operating temperatures are often as high as 500° C. which can have a rapid corrosive effect on the electrodes as well as other materials within the battery cell.

One of the major factors contributing to failure of these batteries is materials instability, i.e., that of the electrodes, spacers, containers and seals. While others have directed their attention toward the development of containers, spacers and electrodes with varying degrees of success, a satisfactory seal has not been developed. A truly hermetic desired has been needed, one which permits no movement of matter in or out of the cell. In terms of active cell components, there should be no loss of electrolyte or gas due to internal pressures. Moreover, there must be no entry from the outer environment of air due to pressure or concentration differentials. With such a seal, degradation by leakage can be eliminated.

BACKGROUND ART

Fused salt batteries of the type discussed hereinabove employ binary salt electrolytes such as lithium chloride-potassium chloride, or ternary salt electrolytes such as calcium chloride-lithium chloride-potassium chloride. The preferred anode is an aluminum lithium alloy; the cathode is constructed from activated carbon in the form of a plate; and, as a metallic current collector from the cathode, tungsten is employed. Such a battery is fully described in U.S. Pat. No. 3,645,792, commonly owned by the Assignee of record herein. The seal between the tungsten rod and the battery container or case comprises a metallic sleeve and an inert refractory material.

The seal, per se, is not the novel aspect of the foregoing patent, it is merely disclosed as a means of passing the tungsten rod through the cell lid, the electrolyte and into the attachment adaptor which is in turn connected to the cathode. The patent refers to an earlier U.S. Pat. No. 3,472,701, for a seal that can be employed. The latter patent, also commonly owned by the Assignee of record herein, comprises a metal element in the form of a coupling, and a ceramic insulating material. The metal coupling is provided around the tungsten current carrier and engages upper and lower followers which compress a sealant material such as boron nitride. Tightening the nuts of the coupling drives the followers together, compressing the boron nitride therebetween as well as around the tungsten rod, and forms a seal.

While both patents disclose seals, neither embodiment has successfully prevented passage of materials in and out of the cell. The purpose of a seal is to prevent the electrolyte and the cell gas atmosphere from leaking out. Also, ingress of oxygen will degrade materials within the cell at both positive and negative potentials through a cyclic regeneration system which results in oxygen being continuously available at the positive potential to combine with the electrode and current carrier.

Lithium, at high chemical activity dissolved in the electrolyte, cannot be permitted to contact glass in seals inasmuch as it reduces the oxide therein to form materials that are electrically conductive and will short the seal across the glass. Lithium in contact with brazing metals forms alloys therewith, rendering the metals brittle or low melting, leading to failure at a brazed joint at the same electrical potential (negative) as the cell case. Therefore, it is necessary that a seal for fused salt batteries not permit the passage of liquids or gasses in or out of the cell inasmuch as either can lead to material degradation within the cell. Also, the components employed to form the seal and protect the tungsten rod must be impervious to attack from the electrolyte, chlorine and dissolved lithium.

DISCLOSURE OF INVENTION

It is therefore an object of the present invention to provide a seal for fused salt batteries which has considerably less weight and volume than existing seals.

It is another object of the present invention to provide a seal which combines mechanical and chemical components in such a way that neither liquids nor gasses generated in fused salt batteries can pass through and attack the current carrier rod or the seal or leak out of the cell at the seal area.

It is yet another object of the present invention to provide a seal for fused salt batteries which does not permit passage of gasses into the cell.

It is a further object of the present invention to provide a seal for fused salt batteries which employs a combination of components that essentially eliminates degradation of the cell due to leakage notwithstanding operating temperatures of up to about 550° C.

It is yet another object of the present invention to provide a process for forming a seal around current conducting rods in fused salt batteries meeting the foregoing objects.

These and other objects, together with the advantages thereof over the prior art, which shall become apparent from the specification which follows, are accomplished by our invention as hereinafter described and claimed.

The seal of the present invention is provided for fused salt batteries having a current conducting rod partially within the battery and partially outside. It includes a layer of compressible material provided on the body of the current conducting rod leaving exposed the opposite ends thereof and a swaged metal sheath covering the coatings compacting the layer of material to approximately its maximum density. If preferred, a coating can be provided on the body of the rod between the rod and the layer of material first disclosed. A sealing glass having a low coefficient of thermal expansion approximating that of the current conducting rod and the metal sheath can also be employed over the end of the sheath, if desired, and a plating of a conductive metal can be provided over the end of the current conducting rod outside of the battery to protect the rod from oxidation at high temperatures.

Where the current conducting rod is tungsten, boron nitride is a suitable material for the first layer. For many embodiments, it and the swaged metal sheath form an effective seal and, in turn, a seal of the present invention. Where additional protection is required, any one or more of the next three elements viz., coating, sealing glass and plating of conductive metal, can also be incorporated into the seal of the present invention. A suitable material for the coating provided between the rod and the boron nitride layer is silicon carbide.

A process is also provided for forming a seal around a current conducting rod between the outside and inside of a battery which includes the steps of providing a layer of compressible material over the body of the rod excluding the opposite ends, swaging a metal sheath over the material on the rod compressing it to approximately its maximum density, removing a portion of the sheath from the layer of material and fastening the swaged metal sheath through a suitable bore in the battery. Additional steps for forming the seal include depositing a coating over the rod between the rod and the layer of material provided thereon, and/or adding a sealing glass over the end of the metal sheath, and/or plating a conductive metal over the end of the current conducting rod outside of the battery. It will be apparent from the description which follows that the additional steps are only necessary for specific embodiments where extra protection is desired.

BRIEF DESCRIPTION OF THE DRAWINGS

FIGS. 2 and 3 depict schematically various embodiments of employing a sealing glass, one of the components of the present invention.

PREFERRED MODE FOR CARRYING OUT THE INVENTION

Figure 1:
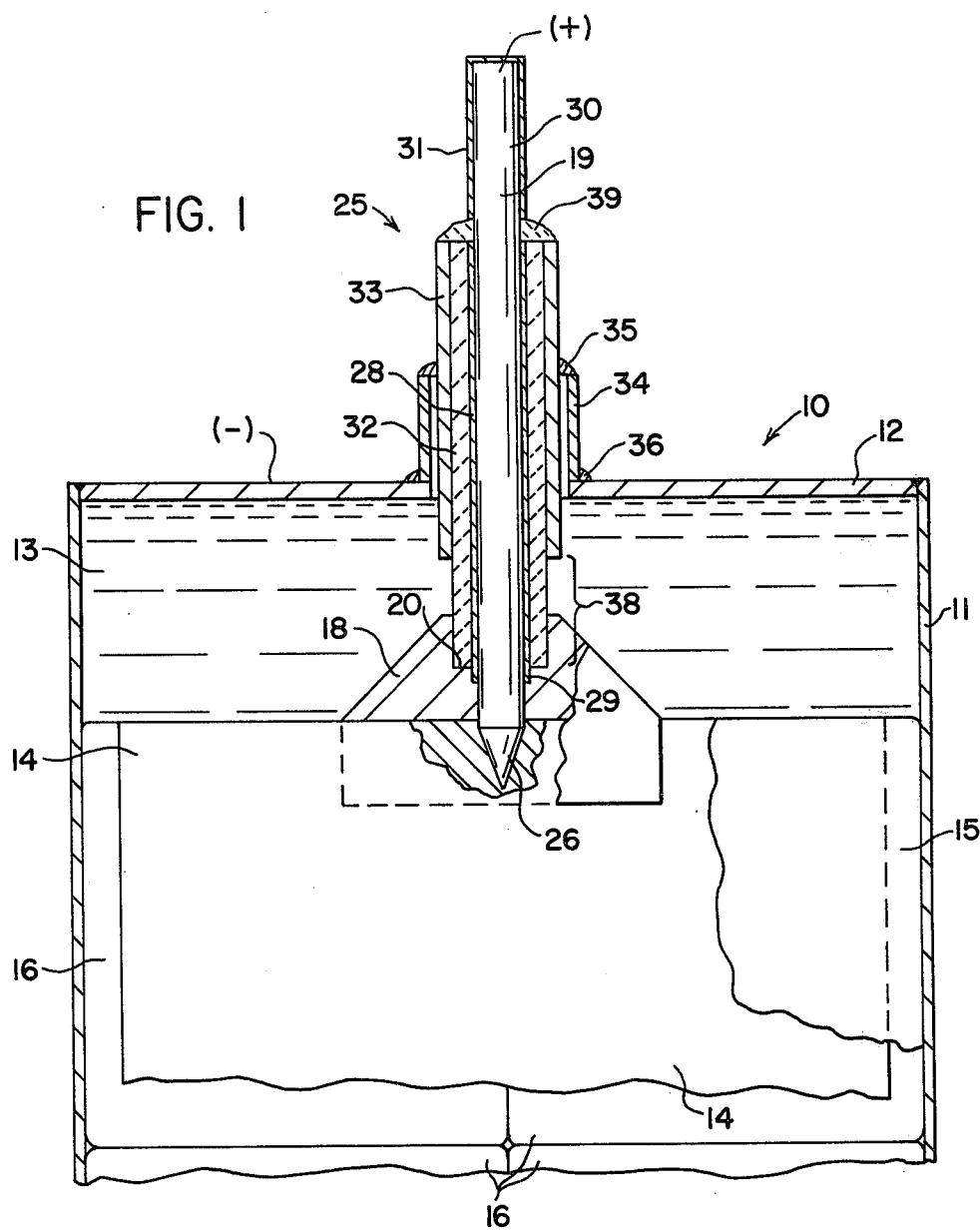
FIG. 1 is a schematic view of the upper portion of a typical fused salt battery depicting the current conducting rod and seal formed between it and the battery case.

With reference to FIG. 1, a portion of a fused salt battery is depicted generally by the numeral 10. The battery 10 comprises an external case, the can 11, which is made of metal and forms the negative potential for the battery, and the lid 12. Inside of the battery is the electrolyte 13, the cathode 14, anodes 15 and 16 in front of and behind the cathode and, the header 18. The header 18 is connected to the cathode 14 in any known, convenient manner. Also, as is known, the anodes and cathode should be separated which can be facilitated by enclosing the cathode in a fiber envelope (not shown). Lastly, a current conducting rod 19 is employed at the positive potential and serves as a means from which to withdraw current from the battery 10 as well as for charging the battery.

With the exception of the seal of the present invention, the battery 10 is generally known and can be constructed as described in U.S. Pat. No. 3,645,792, the subject matter of which is hereby incorporated by reference. As is there described, the anodes can comprise aluminum-lithium alloys, or other lithium-containing alloys, and the electrolyte preferably comprises a eutectic mixture of potassium chloride-lithium chloride, 41 mole percent and 59 mole percent, respectively, having a melting point of 352° C. and a decomposition voltage of about 3.55 volts. Of course other alloys or electrolytes can be selected as components of the cell with which the seal of the present invention can be employed.

The cathode 14 is similarly known and comprises activated carbon. As is also known a small amount of tellurium chloride can be added to the cathode for the purpose of increasing the energy storage of the cathode. The current conducting rod 19 is customarily made from tungsten and is press fitted into a well 20 in the header 18 in order to make contact with the cathode 14 in a manner set forth in the aforementioned U.S. Pat. No. 3,645,792.

The seal of the present invention is indicated generally by the numeral 25. It is formed around the current conducting rod 19 and can include several different layers or coatings. As is customary, the rod 19 is machined to a Vee tip 26 which is inserted into the header 18. Machining should be concluded before any of the coatings are provided so as to prevent any possible damage to the latter. Corrosion resistance can be imparted to the rod 19, if desired, by first applying a coating of high purity stoichiometric silicon carbide. When the rod is tungsten, we have found that high purity stoichiometric silicon carbide should be employed for the coating inasmuch as it can protect tungsten from attack by oxygen as well as chlorine and it has an expansion coefficient close to that of tungsten. It is also insoluble in the electrolyte. Inasmuch as silicon carbide has high electrical resistivity, it can prevent electrical shorts between the positive tungsten and negative metal sheath.

The silicon carbide coating 28 can be provided by chemical vapor deposition and should extend down to but exclude the Vee tip 26. It is preferred that the silicon carbide coating 28 extend along the rod low enough that a portion of it is embedded below the bottom of the header well 20, as is depicted in FIG. 1 at 29. It must also extend the length of the seal 25 but not to the non Vee end 30 of rod 19, otherwise current could not be passed therethrough. It should have a thickness of about 0.025 to 0.050 mm. In order to provide conductivity at the surface of the rod 19 while protecting it from oxidation when the battery is one operated at high temperatures, the non Vee end should be gold plated as depicted by the number 31. Other metals such as silver can be employed; however, despite its cost, gold is best. Thickness of the gold plating should be on the order of about 0.005 to 0.025 mm.

While the silicon carbide coating is optional for certain batteries, a layer absolutely mandatory for the seal 25 is one of a compressible refractory material such as boron nitride. This layer 32, is applied by cold hydropressing a high purity boron nitride powder onto either the silicon carbide coating 28 or directly onto the rod 19. Boron nitride primarily protects against liquid leakage and some gas leakage. It is insoluble in the electrolyte and inert to both chlorine gas and lithium. While boron nitride has been employed heretofore as a seal component, it can crack during operation which then causes electrical shorting to occur through the gap. An advantage therefore of first applying the optional silicon carbide coating 28 is that the latter provides a better bond strength between the boron nitride 32 and the rod 19. Silicon carbide is also nonelectrically conductive relative to tungsten, so that any cracks or voids in the boron nitride layer will not lead to shorting. Boron nitride can be swaged to highly dense compactions due to its lubricious nature. The boron nitride layer 32 basically covers the underlying silicon carbide coating 28 when the latter is employed, but does not extend below the bottom of header well 20.

The second mandatory element of the seal 25 is a metal sheath 33 which is employed to compact the boron nitride layer 32 as well as to provide a surface which can be fastened to a tubular battery seal well 34 in the lid 12 by welding as depicted at 35. The seal well 34 comprises the same metal as the lid 12 and is itself welded thereto as at 36. In order to gain a hermetic seal, the sheath 33 must be swaged onto the rod 19 over the boron nitride layer 32. Sufficient swaging pressure is to be employed to compact the boron nitride to approach its maximum theoretical density without extruding the tungsten rod 19. A suitable means for doing so is with a two die rotary swaging tool at room temperature. Alternate operations would include swaging at 500° C., thermal cycling of a cold swaged seal to 500° C. followed by a single final swaging pass at room temperature and, magnetic forming.

We have found that at best the compaction of the boron nitride layer 32 during its application is only to about 75 to a maximum of 85 percent of its theoretical maximum density. This is obtained at compaction pressures of 552 to 690 MPa. By swaging the metal sheath over the boron nitride, greater than 90 percent of the theoretical maximum density can be obtained greatly increasing the effectiveness of the seal 25. In practice, 93 to 94 percent of the maximum density can be obtained before the tungsten rod is extruded or split, which is to be avoided.

The original sheath is a tube the length of which equals the length of the boron nitride layer 32 and it is swaged thereover. Following swaging, a portion of the sheath 33 is machined away exposing a section 38 of the boron nitride layer 32. In this manner the sheath 33 does not contact the header 18. Wall thickness of the boron nitride layer after swaging is about 0.5 to 0.76 mm.

The metal selected for the sheath 33 should have a low coefficient of thermal expansion, preferably one that is close to that of tungsten. A suitable metal for this purpose is the alloy Kovar comprising 29 percent nickel, 17 percent cobalt and 53 percent iron plus 1 percent minor ingredients. Kovar is a registered trademark of Westinghouse Electric Corporation. Use of a ferritic metal sheath also provides a surface that can be welded to the battery seal well 34, which is also ferritic. Kovar is available in seamless tubing and has good oxidation resistance below 600° C. Other metals that could be substituted therefor should have the lowest thermal expansion value compatible with fabrication welding and cost. Iron-nickel-containing alloys would be suitable for consideration. Swaging forms an effective enough seal with the boron nitride layer being compacted against the plated rod 19, or silicon carbide coating when employed, that any possibility of liquid leakage through the seal is virtually eliminated.

In order to eliminate oxygen ingress, which we have calculated to be about 20 mg in 5 years at 500° C., an amount sufficient to cause degradation, a glass seal must be employed. The seal, indicated in FIG. 1 by the numeral 39, can be either a hard sealing glass or a solder glass. Both systems can be handled in several ways. In FIG. 1, the sealing glass 39 could simply be located between the rod 19 and sheath 33. As an alternative, a graded seal could be employed, as depicted in FIG. 2, wherein glasses of different expansion coefficients 39a and 39b are employed between the rod and sheath. Lastly, a preformed sleeve 40 of metal, e.g., Kovar, could be welded to the rod 19 and the sealing glass would be employed between the ends of sheath 33 and sleeve 40, leaving a small pocket of air as depicted in FIG. 3 at 41.

Two criteria which must be met for a successful glass to metal seal at 500° C. are the expansion match and the strain point of the glass. Glass selection is based upon minimizing the thermal expansion mismatch and avoiding continuous operation above the strain point of the glass wherever possible. Good seals can be made if the expansion differential is less than 500 parts per million (PPM).

Suitable hard sealing glasses commercially available are 7056 and 7720 from Corning. Suitable solder glasses are 7574 from Corning and SG-7 from Owens-Illinois. Based upon available expansion mismatch data, the glass for FIG. 1 could be Corning 7720; the glass for FIG. 2 could be Corning 7056 for glass 39a and Corning 7720 for glass 39b; and, the glass for FIG. 3 is Corning 7056.

To be effective, the seal of the present invention must be capable of functioning for five years with a helium leak rate at room temperature of $<10^{-10}$ cc/atm/sec for a one atmosphere differential across the seal. The best known seals to date have only been able to perform at a helium leak rate at room temperature of $>3\times10^{-7}$ cc/atm/sec for a one atmosphere differential across the seal. By employing the various layers and coatings in a seal according to the present invention, it is believed that the desired life of a fused salt battery can be obtained.

Based upon the foregoing disclosure, it should be apparent that the use of the seal described herein will carry out the objects set forth hereinabove. It should also be apparent to those skilled in the art that the seal of the subject invention can also be utilized with other types of fused salt batteries and that the seal itself can comprise other materials when the electrochemical couple does not evolve chlorine. It is to be understood that such variations fall within the scope of the claimed invention; therefore, the selection of specific materials can be determined without departing from the spirit of the invention herein disclosed and described. Moreover, the scope of the invention shall include all modifications and variations that may fall within the scope of the attached claims.

We claim:

1. A seal for fused salt batteries having a current conducting rod partially within said battery and partially outside comprising:
   a layer of material provided on the body of said current conducting rod leaving exposed the opposite ends thereof, said layer being inert in the fused salt electrolyte and compressible; and
   a swaged metal sheath covering said layer compacting it to approximately its maximum density.

2. A seal, as set forth in claim 1, wherein said current conducting rod is tungsten and said layer of material comprises boron nitride.

3. A seal, as set forth in claim 2, said seal further comprising:
   a coating provided on the body of said rod between said rod and said layer of material.

4. A seal, as set forth in claim 3, wherein said coating comprises silicon carbide.

5. A seal, as set forth in claim 4, wherein said metal sheath comprises an alloy of iron and nickel.

6. A seal, as set forth in claim 5, wherein said alloy further comprises cobalt.

7. A seal, as set forth in claim 1, said seal further comprising:
   a sealing glass having a low coefficient of thermal expansion approximating that of said current conducting rod and said metal sheath, wherein said sealing glass is selected from the group consisting of hard sealing glasses, vitreous solder glass and devitrifying solder glass and is applied over one end of said metal sheath.

8. A seal, as set forth in claim 3, said seal further comprising:
a sealing glass having a low coefficient of thermal expansion approximating that of said current conducting rod and said metal sheath, wherein said sealing glass is selected from the group consisting of hard sealing glasses, vitreous solder glass and devitrifying solder glass and is applied over one end of said metal sheath.

9. A seal, as set forth in claims 1, 3, 7 or 8, said seal further comprising:
a plating of a conductive metal over the end of said current conducting rod outside of said battery, wherein said conductive metal plating is selected from the group consisting of gold and silver.

10. A seal, as set forth in claim 9, wherein said metal is gold.

* * * * *